United States Patent [19]

Masler, III et al.

[11] Patent Number: 4,639,490
[45] Date of Patent: Jan. 27, 1987

[54] PROCESS FOR PREPARING NOVEL COPOLYMER

[75] Inventors: William F. Masler, III, Hinckley; Zahid Amjad, Avon Lake, both of Ohio

[73] Assignee: The B. F. Goodrich Company, Akron, Ohio

[21] Appl. No.: 822,705

[22] Filed: Jan. 27, 1986

Related U.S. Application Data

[60] Continuation-in-part of Ser. No. 685,279, Dec. 24, 1984, Pat. No. 4,566,974, which is a division of Ser. No. 508,636, Jun. 28, 1983, Pat. No. 4,499,002.

[51] Int. Cl.$^4$ .................................................. C08K 5/05
[52] U.S. Cl. ..................................... 524/765; 524/767; 526/307.5
[58] Field of Search ............................... 524/765, 767; 526/307.5

[56] References Cited

U.S. PATENT DOCUMENTS

| | | | |
|---|---|---|---|
| 3,062,776 | 11/1962 | Gaylord | 524/765 |
| 3,450,660 | 6/1969 | Sekmakas | 524/765 |
| 3,894,980 | 7/1975 | De Tommaso | 526/225 |
| 3,988,305 | 10/1976 | Stol et al. | 526/307.5 |
| 4,323,463 | 4/1982 | Morduchowitz | 526/307.5 |
| 4,404,309 | 9/1983 | Masler, III | 524/765 |
| 4,499,002 | 2/1985 | Masler, III et al. | 526/307.5 |

Primary Examiner—Joseph L. Schofer
Assistant Examiner—N. Sarofim
Attorney, Agent, or Firm—A. D. Lobo; A. A. Csontos

[57] ABSTRACT

A process is disclosed for preparing a random copolymer which consists essentially of a copolymer of (i) acrylic acid or methacrylic acid (together "(meth)acrylic"), (ii) acrylamide or methacrylamide (together "(meth)acrylamide"), and (iii) an alkoxyalkyl (meth)acrylate ester ("AAE") present in specified relative proportions. The copolymer is made in alcohol or a mixture of alcohol and water in the presence of an effective amount of initiator, without making a homopolymer or copolymer which is insoluble in water. The random copolymer need not be, and is not separated from the polymerization reaction mixture which is soluble in water, and is surprisingly effective in the treatment of industrial process water used in recirculating water systems, particularly with respect to inhibiting the deposition of calcium phosphate on surfaces of equipment used in such systems.

3 Claims, No Drawings

PROCESS FOR PREPARING NOVEL COPOLYMER

CROSS-REFERENCE TO RELATED APPLICATIONS

This application is a continuation-in-part of Ser. No. 685,279 filed Dec. 24, 1984, now U.S. Pat. No. 4,566,974, which in turn is a division of Ser. No. 508,636 filed June 28, 1983, now U.S. Pat. No. 4,499,002.

BACKGROUND OF THE INVENTION

This invention is related to the preparation of a novel scale inhibiting random copolymer useful in the treatment of predominantly aqueous streams such as water in recirculating cooling water systems, and milk for human consumption. More particularly, it is directed to a method for making a copolymer of (i) acrylic acid or methacrylic acid, hereafter referred to as "(meth)acrylic" acid to denote either acid, (ii) (meth)acrylamide, and (iii) certain (meth)acrylate esters of alkoxylated lower primary alcohols which alkoxylated alcohols are derived by reaction of the alcohol with a lower alkylene oxide under controlled conditions. The copolymer is substantially the only constituent of an essentially non-crosslinked random copolymer which inhibits the formation and deposition of scale-forming inorganic salts such as calcium phosphate from cow's milk during the pasteurization thereof, calcium phosphate, calcium carbonate and calcium sulfate in open-loop "process water" including cooling water systems, and boiler feed water systems. Such systems are prone to scale-forming precipitation of calcium, magnesium and iron salts, particularly calcium and magnesium phosphates, under presently preferred neutral to alkaline conditions for operating process water systems in industrial applications.

Much interest has been generated by the teachings of U.S. Pat. Nos. 3,663,448; 4,029,577; 4,324,664; 4,324,684; and 4,326,980 directed to the efficacy of various (meth)acrylic copolymers in water treatment, the relevant disclosures of which are incorporated by reference thereto as if fully set forth herein. For example, the '577 patent to Godlewski et al discloses that a copolymer of (meth)acrylic acid ("(M)AA" for brevity) or salt thereof, and, a hydroxylated lower alkyl acrylate ("HAA") is highly effective in controlling the formation and deposition of scale and/or suspended solid matter which would otherwise occur in aqueous media containing scale-imparting ions and dispersed particles. The ratio of (M)AA:HAA may be as high as 34:1 and as low as 1:4.

In U.S. Pat. No. 3,663,448 (Ralston), the formation of solid scale-forming salts in aqueous solution is inhibited by adding to the solution small amounts of certain amino phosphonate compounds, together with a water soluble polymer having a molecular weight from about 500 to about 12,000 selected from the group consisting of polyacrylic acid, copolymers of acrylic acid and up to 50% acrylamide and polyacrylamide in which at least 50% of the amide groups are hydrolyzed.

U.S. Pat. No. 4,209,398 (Ii et al) discloses yet another water treating process wherein a polymer having a structural unit derived from a monomer having an ethylenically unsaturated bond and having one or more COOH radicals, is combined with inorganic phosphates, phosphoinc acids, organic phosphonic acid esters, or polyvalent metal salts, to prevent scale formation and corrosion.

The '664 patent to Snyder teaches that the effectiveness of the '577 water-treating composition is enhanced by the addition of a water soluble ester of an aliphatic sulphodicarboxylic acid. The '684 patent to Geiger et al teaches that a compolymer of the '577 patent may be combined with a water-soluble zinc compound and a water-soluble chromate compound to enhance the corrosion-inhibiting effectiveness of the combination. The '980 patent to Snyder discloses a composition comprising an acrylic acid/lower alkyl hydroxylated acrylate copolymer which is administered to a water system in combination with an alkyl phenoxy polyethoxyethanol compound.

As is well known, in addition to the foregoing references, numerous water-soluble polymers including moieties derived from (meth)acrylamide and (meth)acrylic acid have been used to condition water containing scale-forming compounds, among which references are U.S. Pat. Nos. 2,783,200; 2,980,610; 3,285,886; 3,463,730; 3,514,476; 3,518,204; and 3,928,196. None recognized the possibility that (meth)acrylic acid and (meth)acrylamide may each have a well-defined function when they are combined to form a copolymer with an alkoxyalkyl(meth)acrylate ester ("AAE") which, by itself, is essentially insoluble in water; nor, that a copolymer of the three components may be produced in water as the solvent medium for the reaction, so as to save the expense of carrying out the reaction in a non-aqueous medium, then recovering the copolymer and reconstituting it in a desirable aqueous form for shipping.

Particularly with respect to the inhibition of $Ca_3(PO_4)_2$ deposits, one might be led to believe from the prior art that poly[(meth)acrylic acid], for brevity, poly[(M)AA], and poly(acrylamide), for brevity, poly[(M)Am], might have significant activity, but a copolymer of (MA)AA and (MA)Am has very little activity. Also, a copolymer of (M)AA and an AAE, or a copolymer of (M)Am and an AAE has very little activity, and an AAE, but itself being essentially insoluble is an unlikely prospect; yet, a random essentially non-crosslinked copolymer of (M)AA, (M)Am and the AAE has been found to have excellent activity.

Further, in the foregoing closely related prior art, it was uniformly expected that (meth)acrylic acid and (meth)acrylamide were interchangeable, and that whether one or both were present, had an insubstantial effect on the scale-inhibiting activity (hereafter "activity") of any copolymer in which they were essential moieties. We have found this is not true.

As will presently be evident, (meth)acrylic acid and (meth)acrylamide are not interchangeably usable. They are both essential moieties in our copolymer, and the effectiveness of our copolymer, in addition, is critically dependent on the presence of an alkoxylated primary alcohol (APA) ester.

The terpolymer of this invention is particularly useful in cooling water systems including cooling towers, such as referred to in the foregoing prior art patents, in which systems the term "scale" applies to deposits which result from crystallization or precipitation of salts from solution. Scale formation is influenced by the temperature of the water in a particular location, the concentration of the inorganic salts dissolved in that water, the pH of the water, and other factors. It is this scale formation and deposition which is sought to be inhibited.

The current preference for treating cooling water is with a high pH and/or non-chromate corrosion inhibition program which includes phosphates and other salts which lead to the formation of calcium phosphate and other calcium salt deposits. This is equally true of boiler water systems as detailed in the Betz Handbook of Industrial Water Conditioning, 8th Edition, 1980, published by Betz Laboratories, Inc.

SUMMARY OF THE INVENTION

A process has been discovered for preparing a copolymer of (i) acrylic acid ("AA") or methacrylic acid ("MAA"), together "(M)AA", (ii) acrylamide ("Am") or methacrylamide ("MAm"), together "(M)Am", and (iii) an alkoxyalkyl(meth)acrylate ester ("AAE") containing plural reacted alkylene oxide groups. This copolymer is highly effective in the suppression or inhibition of the formation and deposition of scale, particularly calcium carbonate, calcium phosphate and calcium sulfate, so that a system in which the process fluid is a predominantly aqueous stream having a deleterious proclivity to deposit such scale in fluid-conducting portions of the system, may be operated efficiently and economically.

The copolymer has the configuration

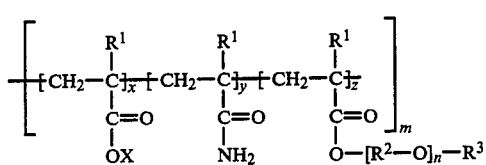

wherein,

X represents H, or NH$_4$, or an alkali metal selected from the group consisting of sodium and potassium;
R$^1$ represents H, or methyl;
R$^2$ represents lower alkyl having from 2 to about 4 carbon atoms;
R$^3$ represents lower alkyl having from 1 to about 10 carbon atoms;
n is an integer in the range from 2 to about 6;
m is an integer in the range from about 3 to about 70; and, for each y (that is, y=1) x is an integer in the range from about 1 to 8, and z is a number in the range from 1 to about 0.075; and , x, y and z are present in relative heterogeneous order.

More specifically, it has been found that a polymerization of the above-identified monomers may be effected in a primary alcohol solvent, or a mixture of the alcohol and water to minimize the formation of a homopolymer of the AAE. The homopolymer is essentially insoluble in water.

It is therefor a specific object of this invention to provide a process for forming a random copolymer having the above-identified structure without forming insoluble homopolymer of AAE.

DETAILED DESCRIPTION OF PREFERRED EMBODIMENTS

The essential effective ingredient of the water treatment composition of our invention is the copolymer having the foregoing structure (I) in which there is at least 1 (one) and preferably from 1 to about 5 (M)AA repeating units for each (M)Am and AAE moieties. The copolymer thus consists essentially of the aforespecified number of repeating units of (M)AA or salts thereof, (M)Am, and AAE.

The esters are prepared in the presence of at least two molar equivalents (moles) and preferably from about 2 to about 6 moles of alkylene oxide (hence "polyalkoxylated"), per mole of primary alcohol, as described in detail hereinafter. Though polymerization of the AAE, (M)AA and (M)Am results in a mixture containing the random copolymer, the desired copolymer is substantially the only copolymer component of the mixture, being present in the range from about 90% to about 99% by wt of the copolymer. Because neither free monomeric or polymeric (M)AA or (M)Am is sufficiently effective in inhibiting scale, it is a further requirement that the random copolymer be substantially free from monomeric (M)AA or (M)Am and poly[(M)AA] or poly[(M)Am].

Since the end use of the copolymer is in aqueous process streams, it is evident that it must be substantially soluble in a designated process stream to be effective for its desired purpose. What is not so evident, is that it is not practical to separate the desired copolymer from the polymerized mixture obtained, and it becomes essential that the process for forming the copolymer not form undersirable insoluble polymers. Such insoluble polymers, if formed, will precipitate in the shipping containers and also in metering equipment.

Though the copolymer is used in low concentrations in the range from about 1 to about 50 ppm in water to be treated, the solubility of the composition is at least 20 parts by wt per 100 parts by wt of water. Typically, the copolymer is used in water in the range from about 2 to about 20 ppm, though in some extreme cases as much as 200 ppm may be used. Thus, high solubility of water treatment compositions is not essential but desirable. The product is preferably shipped in drums as a concentrated aqueous solution containing in the range from about 20% to about 50% by wt of solids per 100 parts of solution. As the proportion of AAE in the copolymer increases, its solubility decreases, and this limits the ratio of alkoxylated repeating units to non-alkoxylated units in the copolymer. It is most preferred to have x in the range from about 1 to about 8, and z in the range from about 1 to about 0.075, where y=1.

The preferred process embodied in this invention utilizes (M)AA which is esterified with an alkoxylated lower primary alcohol ("APA") and subsequently polymerized under controlled conditions. Formation of the APA is effected by reaction of an excess of a lower alkylene oxide having from 2 to about 6 carbon atoms, most preferably one selected from the group consisting of ethylene oxide, propylene oxide and butylene oxide, with a lower primary alcohol having from 1 to about 10 carbon atoms, in the presence of selected hydroxyalkylation catalysts. These catalysts are well known and include sodium hydroxide, pyridine, tetramethylammonium chloride, trimethylbenzyl ammonium chloride and 2,6-lutidine. Most preferred is AA esterified with ethoxytriglycol and may also include minor amounts of various polyalkoxylated alcohol which esters contain from 4 to about 6 carbon atoms.

The effectiveness of the water treatment composition is attributable to the critical presence of the (M)AM and AAE in the amounts stated. Too large a proportion of (M)AM or AAE adversely affects the performance of the composition. Therefore, it is expedient to determine a desirable mix of the relative proportions of the moieties in the copolymer by simple trial and error, within the ranges specified.

The specific composition chosen will desirably be further tailored to maximize thereshold inhibition for a specific scale. Generally, the concentration of the precipitation inhibitor for threshold inhibition is at a markedly lower concentration than for sequestering. See *Industrial Engineering Chemistry*, Vol. 31, pg 51–53 (January 1939); and, *Journal of Physical Chemistry*, Vol 44, No. 5, pg 535–6 (May 1940). Sequestering takes place at a weight ratio of threshold active compound to scale-forming cation components of greater than about 10:1, depending upon the anion components in the water. Threshold inhibition generally takes place at a weight ratio of threshold active compound to scale-forming cation components of less than about 0.5 to 1.0. Thus, depending upon the particular function required of the copolymer, both its concentration in the water, and its composition are chosen by a little trial and error.

The polymerization of the (M)AA (M)Am and AAE is effected, in a mutual solvent for them, preferably, for example, in a hydrocarbon solvent whether aliphatic or aromatic, a lower alkanol having from 1 to about 6 carbon atoms, or in water, with an effective amount of a free radical initiator sufficient to produce the desired composition within an acceptable period of time.

Typically, from about 0.2 to about 5 parts by weight of initiator per 100 parts of (M)AA monomer are used, preferred initiators being acetyl benzoyl peroxide, peracetic acid, hydroxyheptyl peroxide, isopropyl peroxydicarbonate, methyl ethyl ketone peroxide, cyclohexane peroxide, cyclohexyl hydroperoxide, 2,4-dichlorobenzoyl peroxide, cumene hydroperoxide, t-butyl hydroperoxide, methyl amyl ketone peroxide, acetyl peroxide, lauroyl peroxide, benzoyl peroxide, caprylyl peroxide, methyl cyclohexyl hydroperoxide, t-butyl permaleic acid, t-butyl perbenzoate, di-t-butyl diperphthalate, azobis-isobutyronitrile, the so-called redox and heavy metal polymerization initiators and the like, and others. The copolymer is usually formed in high conversion, usually in excess of 90% conversion and often as high as 95to 100%.

The reaction is most preferably carried out in water as the only medium at a temperature in the range from above about 30° C. to about 130° C. usually at atmospheric, or slightly elevated pressure. Though the solubility of the AAE in water is poor, the water appears to dissolve the (M)AA and (M)Am first, forming a solution which dissolves the AAE relatively readily allowing the reaction to proceed smoothly. Thus, the concentration of the copolymer formed may range from about 25% to about 40% by wt, based on total solids, which is a solution which may be shipped directly.

The copolymer may also be formed in an acyclic ketone such as acetone, or in an acyclic ester such as ethyl acetate, or in xylene or toluene. If, for example, the copolymer is formed in isopropanol, or a mixture of isopropanol and water, the copolymer is converted from the alcohol solution to a water solution. Typically, the alcohol is stripped from the solution with steam, or distilled off with subsequent additions of water and repetition of distillation to remove the alcohol, followed by the addition of water and a neutralizing agent such as caustic solution, ammonia, a hydrazine or a low-boiling primary, secondary or tertiary aliphatic amine.

The final aqueous solution of polymer salt is preferably in the range from about pH 5 to about pH 8, and more preferably in the range of pH 6–7, with a total solids content of from about 2 to about 60 percent by weight and preferably from about 5 to about 50 percent by weight of polymer in water.

The copolymers formed may have a weight average molecular weight in the range from about 2000 to about 50,000, and preferably from about 3000 to about 20,000 as determined by gel permeation chromatography. This determination is conventionally made according to ASTM method D-3536-76 (see ASTM Standards, Part 35, 1980), by dissolving the esterified copolymer (as in *J. Polym. Sci., Polym. Chem. Ed.*, 1976, Vol 14, pg 14) in tetrahydrofuran and comparing with a solution in THF of polystyrene of known molecular weight. The acid numbers of the copolymers formed, as determined by a conventional titration with KOH, may range from about 235 to about 585, corresponding to a weight fraction of from 30% to about 75% by wt of monomer units having COOH groups. The preferred polymers have more than 30% by wt of free carboxyl groups and an acid number in the range from about 400 to about 500.

In a typical polymerization process, a glass lined or stainless steel jacketed reactor is charged with predetermined amounts of monomers along with the polymerization catalyst under a nitrogen blanket, and the reaction mixture allowed to exotherm under controlled temperature conditions maintained by a heat-transfer fluid in the jacket of the reactor. The pressure under which the reaction occurs is not critical, it being convenient to carry it out under atmospheric pressure.

EXAMPLE 1

Preparation of a copolymer of acrylic acid (AA), acrylamide (Am) and ethoxytriglycol acrylate (EOTGA)

A round-bottomed flask was charged with 30 g acrylic acid, 16.34 g of a 48.6 solution in water of acrylamide, 10 g ethoxytriglycol acrylate, 0.001 g ferrous sulfate, 3.5 mercaptopropionic acid, and 102 ml of water. The flask was flushed with nitrogen and then 2 ml of 90% t-butylhydroperoxide was injected via a syringe. The solution rapidly exothermed to reflux. The solution in the flask containing polymer was heated at reflux for 2 hr and then cooled. The product obtained weighted 161.4 g and contained 31.8% by weight solids.

In an analogous manner, copolymers are formed by substituting methoxy triglycolacrylate, propoxytriglycolacrylate and butoxytriglycol acrylate for the ethoxytriglycol acrylate. Similarly, methacrylic acid may be used instead of, or in addition to acrylic acid; and, methacrylamide may be used instead of, or in addition to acrylamide to form copolymers with the foregoing AAEs to provide compositions with excellent activity. As one skilled in the art will readily appreciate, the molecular weights of the copolymers formed will vary in accordance with the proportions of monomers charged to the reaction flask, and also with the precise conditions of polymerization.

It will be evident that the value of n in the repeating unit of AAE of the foregoing copolymers is 3, and it is found that most preferred copolymer molecules have n in the range from 2 to about 4. With respect to the polymerization reaction, it will be appreciated that it is essential to maintain the temperature of the reaction mass during polymerization in a suitable temperature range, preferably from about 50° C. to about 130° C., and to do this, suitable means are provided to maintain the desired temperature in the polymerization reactor. This is most conveniently done by allowing the reaction mass to heat to reflux autogenously, or heating it if necessary, under substantially atmospheric pressure, though elevated pressure in the range from 1 to about 5 atm. may be used if desired, then cooling the reactor with appropriate heat exchange means, preferably with a cooling jacket. Additionally, internal heat exchange coils maybe provided in the reactor.

The copolymers formed in each of the foregoing examples, and several others, are used to treat water which contains calcium ions and phosphate ions in a static test to gauge the effectiveness of the polymer for inhibiting the formation and deposition of clacium phosphate, as follows:

A phosphate salt such as $Na_2HPO_4$ or other soluble phosphate is dissolved in water to provide a concentration of 13.3 ppm of $PO_4^{-3}$ ions, and a soluble calcium salt such as calcium chloride is also dissolved in the water to provide a $Ca^{++}$ ion conc. of 110 ppm. To this solution is added the terpolymer in an amount sufficient to provide a dosage of 10 ppm.

100 ml of this solution containing 10 ppm of terpolymer is poured into each of three clean 4 oz glass bottles and the pH is adjusted to 8.4 with NaOH. The bottles are placed in a water bath set at 50° C. and allowed to equilibrate for 5 hours. The temperature is chosen because it closely approximates cooling tower process water temperatures in summer in the northern U.S. The precipitation of calcium phosphate is so rapid that equilibration for more than 5 hours does not substantially change the results obtained with 5 hr.

The bottles are removed from the water bath and the contents filtered through a 0.2 micron millipore filter. The filtrate is allowed to cool to room temperature (20° C.) and then analyzed for $PO_4^{-3}$ using the ascorbic acid method as described in detail in "Standard Methods for the Examination of Water and Wastewater" 14th edition, prepared and published jointly by American Public Health Association et al. The instrument used for the colorimetric measurements was a Beckman 5270 Spectrophotometer. The results of the test were as follows:

initiator mixture was prepared by diluting 24 g of 75% t-butylperoxypivalate solution in odorles mineral spirits to a volume of 45 ml with some of the isopropanol/water solution. The balance of the solvent mixture was then charged to the reactor. The reactor was flushed with nitrogen and held under nitrogen for the duration of the polymerization.

The solvent was heated to reflux and the monomer mixture and the initiator were metered simultaneously into the refluxing solvent. The monomer premix was metered in over 2 hr and the initiator was metered in over 2.5 hr. After all the initiator had been added, the polymerization mixture was held at reflux temperature for one additional hour to ensure completion of polymerization.

The polymer solution in organic solvent was converted to aqueous solution by steam stripping. The polymer solution was cooled and partially neutralized by adding 148 g of 50% sodium hydroxide.

The final product weighed 2067.6 g and contained 40% solids. The product had a Brookfield viscosity of 740 cps and a pH of 4.6.

The polymers in the following Table II were made in an analogous manner.

TABLE II

| Ex. | Ratio of monomers | | | Mw | calcium phosphate % TI* |
|---|---|---|---|---|---|
| | (M)AA | Am | EODGA | | |
| 2 | 70 | 10 | 20 | 6000 | 89 |
| 3 | 70 | 15 | 15 | 7100 | 87 |
| 4 | 75 | 9 | 16 | 6000 | 86 |
| 5 | 75 | 10 | 15 | 7160 | 87 |
| 6 | 76 | 8 | 16 | 12700 | 84 |

*% TI measured as described in U.S. Pat. No. 4,207,405 and J. Pet. Tech. August 1969, 1029-1036, by T. Ralston.

We claim:
1. A method for forming a copolymer of (i) acrylic acid or methacrylic acid, (ii) acrylamide or methacrylamide, and (iii) and alkoxyalkyl (meth)acrylate ester

TABLE I

| Ex. No. | Polymer | Molar ratio of monomers | Weight ratio of monomers | Mol. Wt. (approx.) | % inhibition | | |
|---|---|---|---|---|---|---|---|
| | | | | | $^1Ca(PO_4)_3$ | $^2CaCO_3$ | $^3CaSO_4$ |
| 1 | poly[AA] | | | 2100 | 34 | 73 | 100 |
| 2 | poly[AA] | | | 5100 | 22 | 63 | 82 |
| 3 | poly[Am] | | | 5000 | 0 | 3 | |
| 4 | poly[AA/Am] | 0.11:1 | 10:90 | 4500 | 6 | 9 | 4 |
| 5 | " | 18.7:1 | 95:5 | 4100 | 10 | 70 | 85 |
| 6 | " | 0.81:1 | 45:55 | 4500 | 10 | 70 | 85 |
| 7 | poly[AA/Am/EOTGA] | 3.91:1:0.40 | 63:16.5:20.5 | 4000 | 67 | 45 | 95 |
| 8 | " | 6.9:1:0.61 | 70:10:20 | 4000 | 39 | 72 | 42 |
| 9 | " | 7.89:1:0.306 | 80:10:10 | 4000 | 36 | 69 | 42 |
| 10 | " | 0.99:1:0.068 | 45:45:10 | 4000 | 11 | 34 | 55 |
| 11 | *Natrol 42$^R$ | | | | 23 | 10 | 5 |

$^1$Conditions: $[Ca^{++}]$ = 110 ppm; $[PO_4^{-3}]$ = 13.2 ppm; pH = 8.40 ± 0.05; T = 50° C.; time = 5 hr.
$^2$Conditions: $[Ca^{++}]$ = 110 ppm; $[HCO_3^{-1}]$ = 760 ppm as $HCO_3^-$; $[CO_3^{-2}]$ = 18 ppm as $CO_3^=$; T = 66° C.; time = 24 hr.
$^3$Conditions: $[Ca^{++}]$ = 2000 ppm; $[SO_4^{-2}]$ = 4800 ppm; T = 66° C.; time = 24 hr.
*more fully described in U.S. Pat. No. 4,029,577; the relatively poor activity demonstrated is apparently attributable to the particular commercial sample (order No. 62443) used.

EXAMPLES 2-6

Preparation of a copolymer of acrylic acid (AA), methacrylic acid (MAA), acrylamide (Am) and ethoxydiglycol acrylate (EODGA) also, named 2-(2-ethoxyethoxy)ethyl acrylate A premix of the monomers was prepared in the ratios designated in Table II herebelow. A solvent mixture for the polymerization was prepared by mixing isopropanol and water in a ratio of 5:1 by wt.

In a specific run, a mixture of AA and MAA (560 g), 50% Am (160 g), and EODGA (160 g) are used. An comprising,
reacting preselected amounts of each of the foregoing in the presence of an effective amount of an initiator and a solvent selected from a primary alcohol and a mixture of a primary alcohol with water, at a temperature in the range from about 30° C. to the reflux temperature of the solution, so as to form an alcoholic solution of a random copolymer having the structural formula

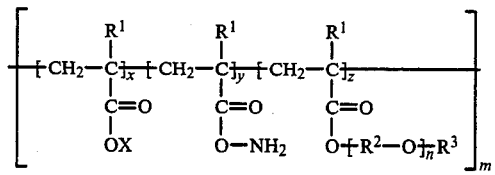

wherein,

X represents H, or NH$_4$, or an alkali metal selected from the group consisting of sodium and potassium;

R$^1$ represents H, or methyl;

R$^2$ represents lower alkyl having from 2 to about 4 carbon atoms;

R$^3$ represents lower alkyl having from 1 to about 10 carbon atoms;

n is an integer in the range from 2 to about 6;

m is an integer in the range from about 3 to about 70; and, for each y (that is, y=1) x is an integer in the range from about 1 to about 8, and z is a number in the range from 1 to about 0.075; and x, y and z are present in relative heterogeneous order, said copolymer being present in the solution in an amount in excess of 90% by weight of polymer formed.

2. The method of claim 1 wherein said alkoxyalkyl ester is selected from ethoxytriglycol acrylate and ethoxydiglycol acrylate.

3. The method of claim 2 wherein said copolymer is present in an amount about 99% by wt of polymer formed.

* * * * *